(12) United States Patent
Ferderer

(10) Patent No.: US 11,056,869 B2
(45) Date of Patent: Jul. 6, 2021

(54) DEVICE FOR LEADING CABLES THROUGH A WALL ORIFICE OF A SWITCH CABINET

(71) Applicant: HARTING Electric GmbH & Co. KG, Espelkamp (DE)

(72) Inventor: Albert Ferderer, Espelkamp (DE)

(73) Assignee: HARTING Electric GmbH & Co. KG, Espelkamp (DE)

( * ) Notice: Subject to any disclaimer, the term of this patent is extended or adjusted under 35 U.S.C. 154(b) by 250 days.

(21) Appl. No.: 16/317,601

(22) PCT Filed: Jul. 26, 2017

(86) PCT No.: PCT/DE2017/100626
§ 371 (c)(1),
(2) Date: Jan. 14, 2019

(87) PCT Pub. No.: WO2018/024286
PCT Pub. Date: Feb. 8, 2018

(65) Prior Publication Data
US 2019/0237954 A1 Aug. 1, 2019

(30) Foreign Application Priority Data
Aug. 5, 2016 (DE) ...................... 10 2016 114 577.7

(51) Int. Cl.
*H02G 3/22* (2006.01)
*H02G 15/007* (2006.01)
(Continued)

(52) U.S. Cl.
CPC ................. *H02G 3/22* (2013.01); *H02G 1/08* (2013.01); *H02G 3/0418* (2013.01);
(Continued)

(58) Field of Classification Search
CPC ...... H02G 15/007; H02G 15/013; H02G 1/08; H02G 3/0418; H02G 3/081; H02G 3/088; H02G 3/22
See application file for complete search history.

(56) References Cited

U.S. PATENT DOCUMENTS 7,556,523 B2 * 7/2009 Mossner .............. H01R 13/447
439/456
2008/0293269 A1 11/2008 Kurizono et al.
(Continued)

FOREIGN PATENT DOCUMENTS

CN 101136543 A 3/2008
CN 104221236 A 12/2014
(Continued)

OTHER PUBLICATIONS

Wikipedia Entry "Cable Entry Systems". Retrieved from https://en.wikipedia.org/wiki/Cable_entry_system on Dec. 12, 2018.

*Primary Examiner* — Minh N Trinh
(74) *Attorney, Agent, or Firm* — Smartpat PLC

(57) ABSTRACT

A device for leading cables through a wall orifice of a switch cabinet includes a one-piece housing with a strain relief element attached to an inner side of the housing. An assembly window is provided on an opposite side, through which assembly window the strain relief elements can be actuated. The closing of the window by a cover causes seal elements to be compressed and the cables to be sealed to the housing.

14 Claims, 4 Drawing Sheets

(51) Int. Cl.
*H02G 15/013* (2006.01)
*H02G 3/08* (2006.01)
*H02G 1/08* (2006.01)
*H02G 3/04* (2006.01)

(52) U.S. Cl.
CPC ........... *H02G 3/081* (2013.01); *H02G 15/007* (2013.01); *H02G 15/013* (2013.01)

(56) References Cited

U.S. PATENT DOCUMENTS

| | | | |
|---|---|---|---|
| 2010/0294527 A1* | 11/2010 | Mullen | H02G 3/088 |
| | | | 174/50.5 |
| 2014/0182928 A1 | 7/2014 | Starke et al. | |
| 2014/0252722 A1 | 9/2014 | Takao et al. | |
| 2016/0033722 A1 | 2/2016 | Ray | |
| 2019/0237954 A1* | 8/2019 | Ferderer | H02G 3/0418 |

FOREIGN PATENT DOCUMENTS

| | | |
|---|---|---|
| DE | 202010008423 U1 | 11/2010 |
| DE | 102011103351 | 9/2012 |
| DE | 202012101639 U1 | 8/2013 |
| DE | 102013007909 A1 | 11/2014 |
| DE | 102014215058 A1 | 2/2016 |
| JP | 2013005636 A | 1/2013 |
| WO | 2012017000 A3 | 4/2013 |

\* cited by examiner

DEVICE FOR LEADING CABLES THROUGH A WALL ORIFICE OF A SWITCH CABINET

TECHNICAL FIELD

The disclosure relates to a device for leading cables through a wall orifice. The disclosure furthermore relates to a method for leading cables through a wall orifice.

BACKGROUND

Devices and methods for leading cables through a wall orifice are needed to lead cables, in particular patch cable assemblies to which plugs are already attached, in particular soldered, into or out of a switch cabinet.

Cable insertion devices for switch cabinets are generally known in the prior art. The use of said cable insertion devices in switch cabinets and in particular their use in the insertion of lines to which plugs are already soldered (line assemblies/patch cable assemblies) is generally known. Divisible cable insertion devices have been described in particular, in which a plurality of different, generally rectangular, slotted seal elements are pushed laterally onto the associated lines and are then together compressed by a frame. The seal elements together with the cables are thus fixed in the frame and the cables are strain relieved by the seal elements. The divisibility of these systems is linked to two major advantages. On the one hand, unsoldering and re-soldering of the plugs to the lines is no longer required, which means that the manufacturer's warranty remains valid. On the other hand, the assembly can also take place later since the cable insertion device is assembled around the existing lines. In the majority of cases, these divided cable insertion systems comprise a hard frame made from plastics material or, more rarely, aluminum (e.g. for the foodstuffs industry) and one or more slotted seal elements which are mostly made from elastomer.

A disadvantage of this arrangement is that this strain relief by means of the respective seal element is inadequate for many applications.

The stability of the strain relief is improved by a plug connector housing, known in the prior art, comprising an installation housing and a sleeve housing which can be plugged thereto and locked via a locking bracket, which sleeve housing is constructed as a half-shell housing, i.e. comprising two housing half shells, having a plurality of cable entries and associated seals matching the cables to be integrated in each case. One of the two housing half shells has, in the connecting region, a connecting wall on which a strain relief clamp is mounted for each cable/each cable entry and which advantageously possesses a rounded recess at each strain clamp. The other of the two housing half shells is open in the connecting region so that the cross-section of the cable is not restricted thereby.

However, this prior art is disadvantageous in that, when adjusting the length of the cables within the switch cabinet, handling proves extremely difficult since the half-shell housing must be unlocked and separated at least from the attachment housing to release the screw clamps, adjust the cable to the correct length and screw-fasten it at the clamps again. Furthermore, even the two housing half shells must be separated from one another in this case. This method is therefore very complex, extremely unintuitive and is hindered in particular in that the unlocked plug connector is automatically at a greater distance from the switch cabinet during assembly than in the installed state, i.e. the ideal cable length simply cannot be adjusted correctly for many applications. The consequence is that the cable length of the cables within the switch cabinet are too long and the cables exert corresponding stresses and transverse forces on the contacts/cable connections of the components within the switch cabinet and these become prematurely worn.

SUMMARY

The object of the invention consists in solving the above-mentioned problems and providing a device and a method which are suitable for simplifying the handling of inserted patch cables in the switch cabinet.

This object is achieved by the device for leading cables through a wall orifice as claimed.

The object is furthermore achieved by a method for leading cables through a wall orifice as claimed.

The device for leading cables through a wall orifice comprises at least one seal element, at least one strain relief element, and a housing for attaching to a wall of a switch cabinet in the region of the wall orifice arranged in the wall, wherein the housing has the following:
  a fastening region having fastening means for fastening the housing on the wall of the switch cabinet;
  a sleeve region having at least one cable insertion opening for receiving the at least one seal element and a cable guided through the seal element;
and wherein the strain relief element can be fastened on the housing in order to fix the cable on the housing, wherein the at least one strain relief element is mounted on an inner side of the sleeve region, and wherein the housing has, on an opposite side of its sleeve region, an assembly window through which the strain relief element can be actuated.

The method for leading cables through a wall orifice comprises the following steps:
  a) selecting at least one seal element which is suitable for the cross-section of the cable to be integrated and integrating the cable in the seal element;
  b) opening a window of a housing fastened on a wall of a switch cabinet;
  c) pushing the at least one seal element with the cable integrated therein laterally into a cable insertion opening of the housing;
  d) positioning the cable in the switch cabinet in the desired position whilst simultaneously moving the cable through the seal element to achieve the desired cable length in the switch cabinet;
  e) fixing the cable by means of a strain relief element on an inner side of the housing by actuating the strain relief element through the open window;
  f) closing the window and simultaneously compressing the seal element to increase the tightness thereof with respect to the cable and the housing.

Advantageous configurations of the invention are described in the dependent claims.

The invention has the advantage that, in particular, patch cables, i.e. cables which are distinguished by already being provided with plug connectors at both ends, can also be introduced into a switch cabinet and brought to the ideal length within the switch cabinet in an intuitive and convenient manner so that corresponding stresses and transverse forces exerted by the cables on the contacts/cable connections of the components within the switch cabinet can be prevented or at least considerably reduced.

In particular, the housing with its holding region and its sleeve region can be constructed in one piece. This has the advantage of considerable cost savings during production. Finally, it is possible to dispense with a locking device completely. However, as a result of the substantially more cost-effective window, the assembly of the strain relief device proves considerably more convenient than for a multi-part system corresponding to the prior art. In particular, the actuation of the strain relief device takes place in its final position, which makes for particularly intuitive length measurement of the part of the cable which is located in the switch cabinet.

The device advantageously has a cover matching the assembly window, by means of which the assembly window can be closed, in particular screw-fastened to the housing. The required sealing is thus achieved.

In a preferred configuration, the at least one cable insertion opening can be connected to the assembly window and therefore have an insertion region bordering the assembly window, into which the seal element can be pushed from the direction of the assembly window. To this end, it is particularly advantageous if the cable insertion opening has two mutually parallel edges, at least along its insertion region, and the seal element can be integrated in the cable insertion opening with form and force fit and has, at least at one end region, two parallel edges and a delimiting surface terminating at a right angle therewith, which parallel edges, in the pushed-in state, are in mechanical contact with the parallel edges of the cable insertion opening. The seal element can thus be pushed laterally into the cable insertion opening and also compressed slightly in this direction.

In particular, the cable insertion opening can have a groove, in particular extending through 180°, along its edge and the seal element can have a collar matching said groove, which can be integrated in the groove with form fit. The seal element is thus guided in the cable insertion opening as it is pushed in laterally, which simplifies handling considerably.

For it to be pushed into the cable insertion opening together with the cable, it is advantageous if the seal element has a through opening for receiving the cable and furthermore a lateral slot for integrating the cable in the through opening so that the seal element, together with the patch cable integrated therein, can be integrated in the cable insertion opening. In particular, it is advantageous if the length of the seal element slightly exceeds the length of the cable insertion opening of the housing because the integrated seal element thus projects slightly beyond the open window and, as a result of closing the window by means of the cover, can be compressed to build up stress with respect to housing and with respect to the cable in the closed state and therefore achieve greater tightness in the closed state than in the unclosed state. The characterizing feature that "the length of the seal element slightly exceeds the length of the cable insertion opening of the housing" can be understood, for example, to mean that the length of the seal element exceeds the length of the cable insertion opening of the housing by a length X, where X can assume in particular the following values:

0.1 mm<X<4 mm,
in particular 0.1 mm<X<2 mm,
preferably 0.2 mm<X<1 mm,
particularly preferably 0.3 mm<X<0.6 mm.

For example, the seal element in the pushed-in state extends beyond the open window by this value X. As a result of closing the window, in particular by means of the cover, the seal element is compressed slightly and therefore ensures particularly good sealing with respect to the cable on the one hand and to the housing on the other.

The fastening region can comprise a flange, in particular having through-bores, with which the housing can be fastened, in particular screwed, on the wall of the switch cabinet. To this end, it is particularly advantageous if the wall orifice/sheet-metal cutout of the opening corresponds to a standard rectangular plug connector.

The at least one strain relief element can comprise at least one screw, by means of which the cable can be fixed on the sleeve housing using a screwdriver guided through the assembly window. In particular, the strain relief element can be a screw clamp having two screws with which the cable is screwed to the inner side of the housing.

BRIEF DESCRIPTION OF THE DRAWINGS

An exemplary embodiment of the invention is illustrated in the drawings and will be explained in more detail below. The drawings show.

DETAILED DESCRIPTION

The figures contain partially simplified schematic illustrations. Identical reference signs are sometimes used for elements which are similar but possibly not identical. Varying views of similar elements could be drawn to different scales.

Figure 1A:
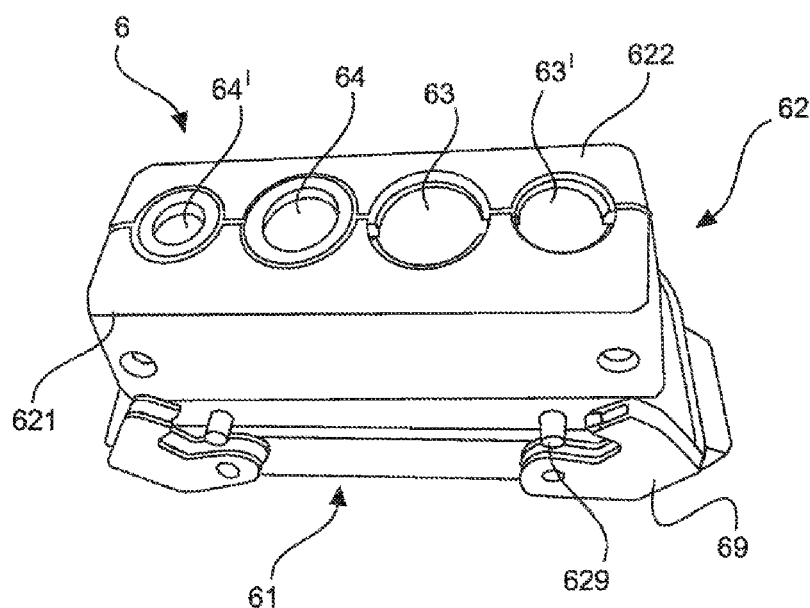
FIG. 1 shows a system corresponding to the prior art, formed from a plurality of conventional plug connector housing components.
Figure 1B:
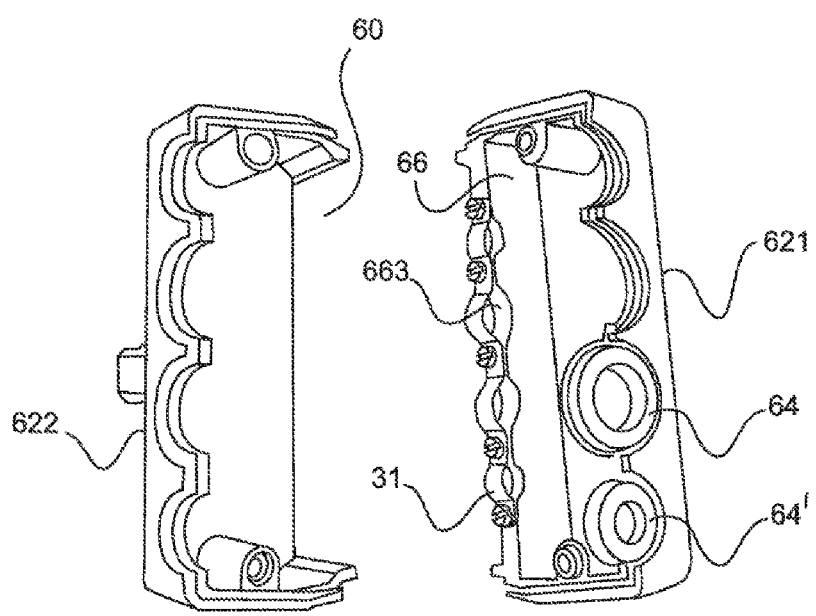

FIG. 1 shows a system 6 corresponding to the prior art, which comprises a plurality of components which come from the region of the plug connector housing.

The system 6 comprises a typical attachment housing 61 and a sleeve housing 62 which can be plugged thereto and locked on its locking pin 629 by means of a locking bracket 69. The attachment housing 61 is provided to be fastened on a wall, e.g. of a switch cabinet, in the region of a wall orifice arranged therein. The sleeve housing 62 is constructed in the form of a half-shell housing, i.e. it comprises two housing half shells 621, 622 having a plurality of cable entries 63, 63' and associated seal elements 64, 64' matching the cables and cable entries 63, 63' to be integrated in each case. One of the two housing half shells 621 has, in the region in which it is connected to the attachment housing 61, a connecting wall 66 on which a screw clamp 31 is mounted for each cable/cable entry for the purpose of strain relief. Therefore, a cable can be provided with a seal element 64, 64' in that the cable penetrates the seal element 64, 64'. The cable, together with the seal element 64, 64', can then be inserted into a suitable cable entry 63, 63' to seal said cable. By screwing the two housing half shells 621, 622 together, the seal elements 64, 64' are fixed in the sleeve housing 62 and therefore seal the respective cable with respect to the sleeve housing 62. Along its further extent, the cable can be screwed against the connecting wall by means of a screw clamp 31 for the purpose of strain relief. At this point, the connecting wall ideally possesses a rounded recess 663 for partially receiving the cable. The other half shell 622 possesses a connecting opening 60 opposite the connecting wall 66 in the connecting region so that cables having a large cross-section can also be integrated in the system 6, and thus in the switch cabinet, in the manner described.

It is clear that the cabling requires some degree of assembly effort since the housing half shells 621, 622 have to be separated from one another. Furthermore, the actuation, i.e. in this case the screw-fastening of the strain relief device, can only take place in the unlocked state. The spacing between the strain relief device of the respective cable and its connection point in the switch cabinet in the assembly state thus deviates considerably from the corresponding spacing in the operating state. A cable length within the switch cabinet which is consequently too long then results in stresses and transverse forces being exerted by the patch cables on contacts and/or cable connections of the connected components within the switch cabinet, which can have an unfavorable effect on their useful life. The cabling Is thus also confusing and takes up an unnecessarily large amount of valuable space in the switch cabinet.

Figure 2:
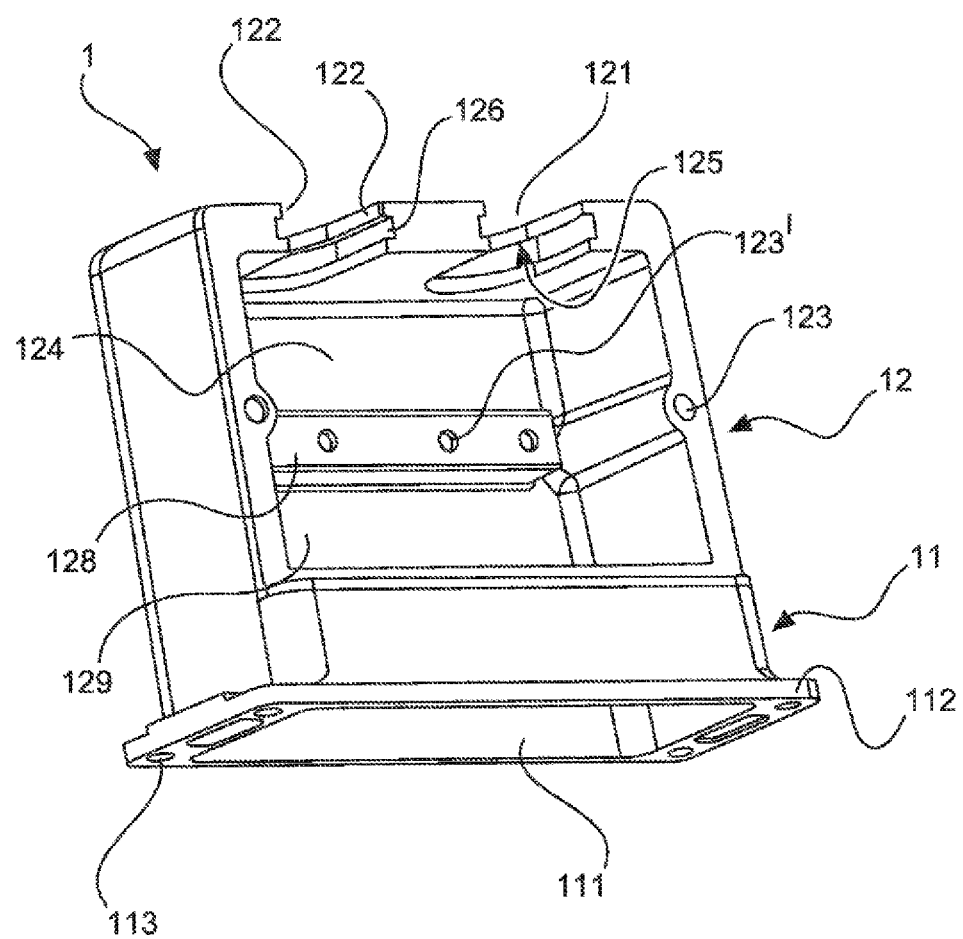
FIG. 2 shows a single-part housing having an assembly window.

In contrast thereto, FIG. 2 shows a single-part housing 1 according to the invention. This housing 1 possesses a fastening region 11 and a sleeve region 12. The fastening region 11 possesses a flange 112 having through bores 113 and an opening 111 for fastening the housing 1 on the wall of the switch cabinet in the region of its wall orifice, on which the opening 111 of the housing 1 is arranged.

Figure 5:
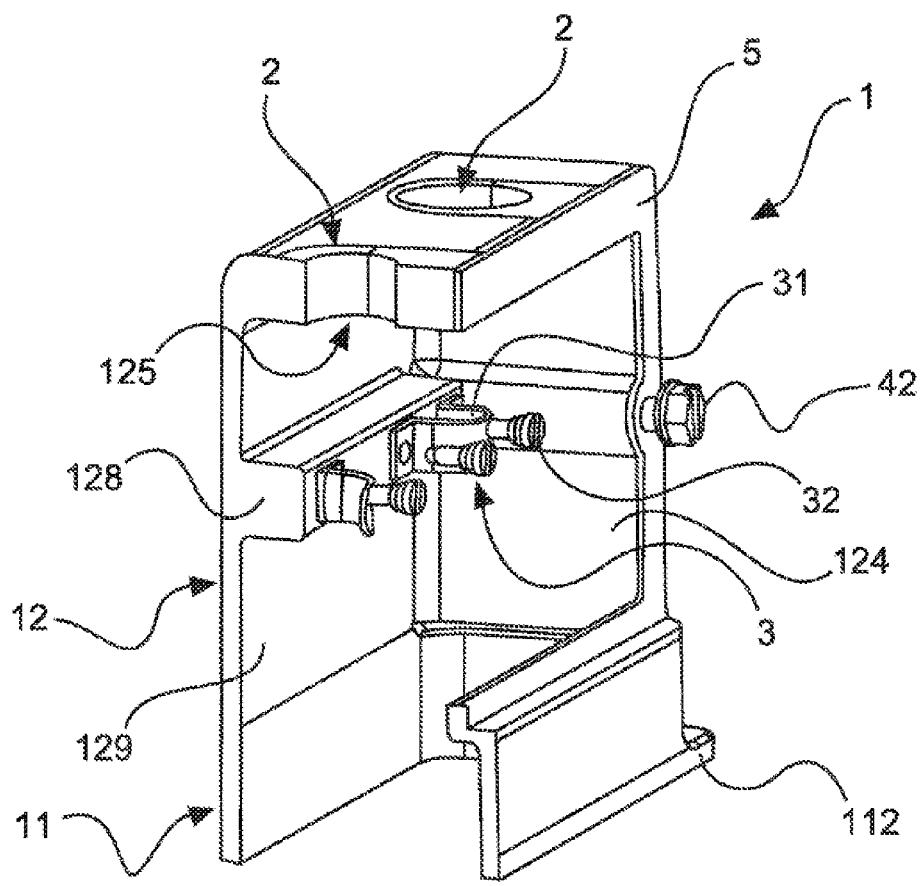
FIG. 5 shows the housing in section with screw clamps and seal elements, and a rubber flange seal.

In this embodiment, the sleeve region 12 possesses two cable entry openings 125, although a different number is also conceivable. The housing 1 furthermore possesses, on an inner side, a fastening web 128 having threaded bores 123' for screwing on strain relief elements 3, which are illustrated in FIG. 5, and which comprise screw clamps 31 provided with screws 32. On the opposite side, the housing 1 has an assembly window 124. Unlike in the previous illustration, the cable insertion openings 125 do not have a completely circular structure, but each have, at an insertion region 121 bordering the assembly window 124, two mutually parallel edges 122 in order to facilitate the lateral pushing-in of the seal elements 2 illustrated in the following FIG. 3. The cable insertion devices 125 are therefore connected to the assembly window 124 via these parallel edges 122. The cable insertion opening 125 possesses a groove 126 along its entire edge.

Figure 3:
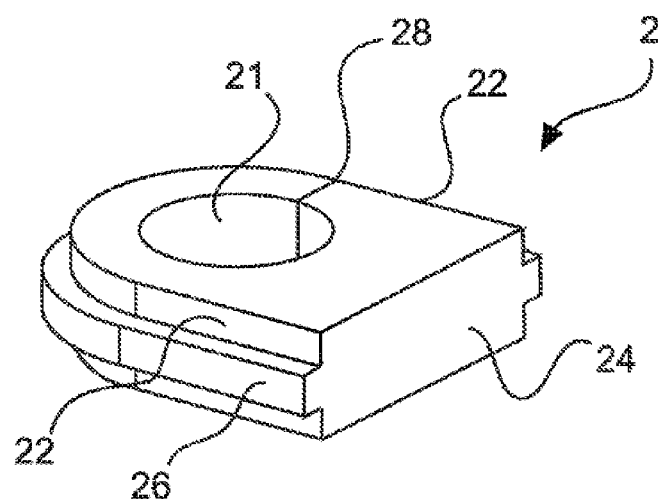
FIG. 3 shows a seal element.

FIG. 3 shows a seal element 2. The seal element 2 possesses a through-opening 21 for receiving the cable to be inserted into the switch cabinet. Furthermore, the seal element 2 possess a lateral slot 28 for integrating the cable in the through opening 21 of the seal element 2. Moreover, the seal element 2 possesses, at its outer edge formed in a complementary manner to the cable insertion opening 125, a collar 26 extending through 180o, which can be integrated in the groove 126 of the cable insertion opening 125 with form fit. At an end region, the seal element 2 possesses two mutually parallel lateral surfaces 22, on which the collar 26 is likewise integrally formed, and a delimiting surface 24 terminating at a right angle therewith and on which a collar is not formed.

Therefore, the seal element 2, together with the cable integrated in its through-opening 21, can be integrated in the cable opening 125 of the housing 1, namely pushed in from the direction of the assembly window 124.

In this case, the length of the seal element 2 can slightly exceed the length of the cable insertion opening 125 of the housing 1 so that the delimiting surface 24 also projects slightly from the cable insertion opening in the fully pushed-in state, whereby, as a result of closing the window, e.g. by screw-fastening the cover 4 illustrated in the following FIG. 4, the integrated seal element 2 can be compressed as a result of pressure on the delimiting surface 24 in order to achieve greater tightness with respect to the housing 1 and with respect to the cable in the closed state of the window.

Figure 4:
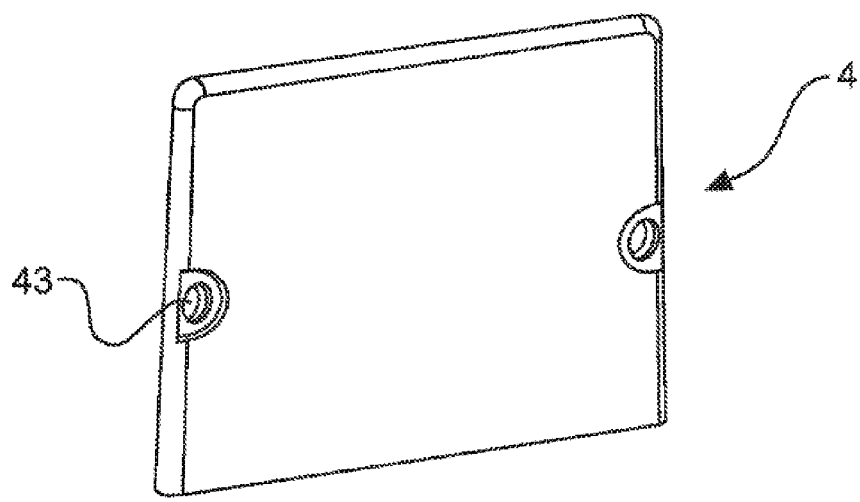
FIG. 4 shows a cover for the assembly window.

To this end, the cover 4 illustrated in FIG. 4 possesses two screw bores 43 via which it can be screw-fastened at the threaded bores 123 of the housing 1, although it goes without saying that a different number of screw bores, for example 4, is also conceivable. Its slightly trapezoidal form is adapted to that of the sleeve region 12 and therefore to that of the assembly window 124.

FIG. 5 shows the housing 1 of FIG. 2 in cross-section through its first cable insertion opening 125, in which a seal element 2 is already integrated, albeit without an integrated cable for the sake of clarity.

A strain relief element 3 constructed in the form of a screw clamp is furthermore illustrated, which, by means of two associated screws 32 (extending freely in the drawing) can be screwed to an inner side 129 of the housing 1 in the sleeve region 12 of this latter, namely on a fastening web 128 provided for this purpose, by means of which the housing 1 has the required strength on its inner side 129.

Furthermore, the housing 1 possesses, at the edge of its window 124, a rubber flange seal 5 for sealing with respect to the cover 4 of the previous illustration, which is to be screwed on by means of the housing screws 42 via threaded bores 123.

With the aid of these illustrations, it easily conceivable that the housing 1 can be arranged with its opening 111 against the wall orifice, in particular against a standardized panel cutout, of a wall, in particular the wall of a switch cabinet, and screwed thereto by means of its flange 112. Furthermore, the cable can be provided with a matching seal element 2 in that the cable is inserted through the slot 28 into the matching through opening 21 of the seal element 2. The cover 4 of the housing 1 can be opened. When the cover 4 is open, the seal element 2 with the cable integrated therein can be pushed laterally into the cable insertion opening 125 of the housing 1. The cable is then brought into the desired position in the switch cabinet. This occurs as the cable is simultaneously moved through the seal element 2 to achieve the desired cable length in the switch cabinet. By means of the strain relief element 3, which refers to a screw clamp 31 and two associated screws 32, the cable, once it is located in its final position, is fixed on the inner side 129 of the housing 1, and in particular on the fastening web 128 integrally formed thereon, by actuating, namely screw-fastening, the strain relief element 3 through the open window 124. The window 125 can now be closed by screwing on the cover 4, in particular simultaneously compressing the seal element 2 by means of the cover 4 to increase the tightness of said seal element with respect to the cable and to the housing 1 and to the cover 4.

LIST OF REFERENCE SIGNS

1 Housing
11 Fastening region
112 Flange
113 Through bores
12 Sleeve region
121 Insertion region
122 Parallel edges
123, 123' Threaded bores
124 Assembly window
125 Cable insertion opening
126 Groove
128 Fastening web
2 Seal element
2 Through opening
24 Delimiting surface 26 Collar
28 Slot
3 Strain relief element
31 Screw clamp
32 Screw for screw clamp
4 Cover
43 Screw bore of the cover
5 Rubber flange seal
6 System (known)
61 Attachment housing
62 Sleeve housing/half shell housing
621, 622 Half shells
629 Locking pin
63, 63' Cable entries
64, 64' Seal elements
66 Connecting wall
663 Rounded recesses
69 Locking bracket

The invention claimed is:

1. A device for leading a cable through a wall orifice of a switch cabinet, comprising:
   a seal element;
   a strain relief element; and
   a housing for attaching to a wall of a switch cabinet in a region of the wall orifice arranged in the wall, wherein the housing has
      a fastening region for fastening the housing on the wall of the switch cabinet,
   an opening formed in the fastening region through which the cable is lead into the switch cabinet, and
      a sleeve region having a cable insertion opening for receiving the seal element and the cable guided through the seal element,
   the cable insertion opening being formed in a rear portion of the housing and
      the cable insertion opening and the opening in the fastening region being arranged on opposite sides of the housing to form a generally straight path for the cable from the cable insertion opening to the opening in the fastening region,
   wherein the strain relief element is fastened on the housing in order to fix the cable on the housing,
   wherein the strain relief element is mounted on an inner side of the sleeve region between the rear portion of the housing and the fastening region of the housing,
   wherein the housing includes an assembly window which extends from the rear portion of the housing perpendicular to the cable insertion opening along side portions of the housing towards the fastening region, and
   wherein the strain relief element can be actuated through the assembly window.

2. The device as claimed in claim 1, wherein the housing with its fastening region and its sleeve region is constructed in one piece.

3. The device as claimed in claim 1, wherein the device has a generally flat cover matching the assembly window, by which the assembly window can be closed.

4. The device as claimed in claim 3, wherein the cover is adapted to be screw-fastened to the housing.

5. The device as claimed in claim 3, wherein the cable insertion opening is connected to the assembly window and therefore has an insertion region bordering the assembly window.

6. The device as claimed in claim 5, wherein the cable insertion opening has two mutually parallel edges at least along its insertion region.

7. The device as claimed in claim 6, wherein the seal element is integrated in the cable insertion opening with form and force fit and has, at least at one end region, two parallel lateral surfaces and a delimiting surface terminating at a right angle therewith.

8. The device as claimed in claim 7, wherein the seal element is adapted to be pushed into the cable insertion opening from a direction of the assembly window so that, in a pushed-in state, the parallel lateral surfaces of the seal element are in mechanical contact with the parallel edges of the cable insertion opening.

9. The device as claimed in claim 8, wherein the cable insertion opening has a groove along its edge and wherein the seal element has a collar matching said groove, which can be integrated in the groove with form fit.

10. The device as claimed in claim 7,
    wherein the seal element has a through opening for receiving the cable,
    wherein the seal element has a lateral slot for integrating the cable in a through opening of the seal element,
    wherein the seal element, together with the integrated cable, is adapted to be integrated in the cable opening and
    wherein a length of the seal element slightly exceeds a length of the cable insertion opening of the housing,
    whereby, as a result of closing the window by the cover, the seal element can be compressed to achieve a tightness with respect to housing and with respect to the cable which is greater in a closed state than in an unclosed state.

11. The device as claimed in claim 1, wherein the housing comprises a flange having through-bores, by which the housing can be screwed on the wall.

12. The device as claimed in claim 1, wherein the strain relief element comprises at least one screw by which the cable can be fixed on the sleeve region of the housing using a screwdriver guided through the assembly window.

13. The device as claimed in claim 1, wherein the strain relief element is fastened on a fastening web which extends perpendicular to the generally straight path for the cable.

14. The device as claimed in claim 13, wherein the fastening web comprises threaded bores.

* * * * *